(12) United States Patent
Lee et al.

(10) Patent No.: US 11,485,875 B2
(45) Date of Patent: *Nov. 1, 2022

(54) VISIBILITY IMPROVING FILM FOR DISPLAY PANEL AND DISPLAY DEVICE COMPRISING SAME

(71) Applicant: LG CHEM, LTD., Seoul (KR)

(72) Inventors: Hanna Lee, Daejeon (KR); Kwangseok Seo, Daejeon (KR); Yeongrae Chang, Daejeon (KR); Jung Hyun Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/976,699

(22) PCT Filed: Mar. 11, 2019

(86) PCT No.: PCT/KR2019/002809
§ 371 (c)(1),
(2) Date: Aug. 28, 2020

(87) PCT Pub. No.: WO2019/172731
PCT Pub. Date: Sep. 12, 2019

(65) Prior Publication Data
US 2020/0407588 A1 Dec. 31, 2020

(30) Foreign Application Priority Data

Mar. 9, 2018 (KR) .................. 10-2018-0028073
Mar. 8, 2019 (KR) .................. 10-2019-0027071

(51) Int. Cl.
| | | |
|---|---|---|
| *B32B 27/36* | (2006.01) | |
| *C09D 135/02* | (2006.01) | |
| *G02B 5/02* | (2006.01) | |
| *G02B 1/11* | (2015.01) | |
| *B32B 7/12* | (2006.01) | |
| *B32B 27/06* | (2006.01) | |
| *C08K 3/22* | (2006.01) | |

(52) U.S. Cl.
CPC .............. *C09D 135/02* (2013.01); *B32B 7/12* (2013.01); *B32B 27/06* (2013.01); *B32B 27/36* (2013.01); *G02B 1/11* (2013.01); *G02B 5/0242* (2013.01); *G02B 5/0284* (2013.01); *B32B 2307/412* (2013.01); *B32B 2457/202* (2013.01); *B32B 2457/206* (2013.01); *C08K 2003/2227* (2013.01); *C08K 2201/005* (2013.01)

(58) Field of Classification Search
CPC ... B32B 27/06; B32B 27/36; B32B 2307/412; B32B 2307/416; B32B 2457/202; B32B 2457/206; C09D 135/02; G02B 1/11; G02B 5/0242; G02B 5/0284; C08K 3/08; C08K 2201/005; C08K 2003/0812; C08K 2003/0806; C09K 2323/03; C09K 2323/035; C09K 2323/06
USPC ............ 428/1.1, 1.3, 1.33, 1.6; 359/599, 609
See application file for complete search history.

(56) References Cited

U.S. PATENT DOCUMENTS

| | | |
|---|---|---|
| 7,468,228 B2 | 12/2008 | Hatakeyama |
| 2008/0032146 A1 | 2/2008 | Toyoshima et al. |
| 2009/0142562 A1 | 6/2009 | Miyagawa et al. |
| 2009/0231713 A1 | 9/2009 | Takada |
| 2014/0178706 A1* | 6/2014 | Park .................. G02B 1/14 428/480 |
| 2016/0289459 A1* | 10/2016 | Ohashi ................. C09D 133/00 |
| 2017/0351009 A1 | 12/2017 | Matsuo et al. |
| 2018/0134854 A1 | 5/2018 | Kim et al. |
| 2018/0180982 A1 | 6/2018 | Yamaki et al. |
| 2018/0313978 A1 | 11/2018 | Chang et al. |
| 2018/0348411 A1 | 12/2018 | Yamaki et al. |
| 2019/0224942 A1 | 7/2019 | Matsuo et al. |
| 2020/0257021 A1* | 8/2020 | Seo .................... B32B 7/02 |

FOREIGN PATENT DOCUMENTS

| | | |
|---|---|---|
| CN | 1651992 A | 8/2005 |
| CN | 101533110 A | 9/2009 |
| CN | 103885112 A | 6/2014 |
| CN | 105164556 A | 12/2015 |
| CN | 105764995 A | 7/2016 |
| CN | 107209292 A | 9/2017 |
| CN | 107272092 A | 10/2017 |
| CN | 107667305 A | 2/2018 |
| CN | 107850829 A | 3/2018 |
| CN | 111278642 A | 6/2020 |
| JP | 2002-080621 A | 3/2002 |
| JP | 2007-057612 A | 3/2007 |
| JP | 2007-293303 A | 11/2007 |

(Continued)

OTHER PUBLICATIONS

International Search Report issued for International Application No. PCT/KR2019/002809 dated Jun. 28, 2019, 4 pages.

*Primary Examiner* — Ruiyun Zhang

(74) *Attorney, Agent, or Firm* — Rothwell, Figg, Ernst & Manbeck, P.C.

(57) ABSTRACT

The present disclosure relates to a visibility improving film for a display panel and a display device including the same. More specifically, the present disclosure relates to a visibility improving film for a display panel capable of exhibiting excellent physical and optical properties particularly while improving the visibility of a laser pointer, by using polyethylene terephthalate as a substrate and including fine metal particles dispersed in the photocurable resin layer, and to a display device including the same.

14 Claims, No Drawings

(56) References Cited

FOREIGN PATENT DOCUMENTS

| | | |
|---|---|---|
| JP | 2009-037046 A | 2/2009 |
| JP | 2009-209329 A | 9/2009 |
| JP | 2010-054861 A | 3/2010 |
| JP | 2010-060924 A | 3/2010 |
| JP | 2010-113219 A | 5/2010 |
| JP | 2010-165547 A | 7/2010 |
| JP | 2013-246371 A | 12/2013 |
| JP | 2014-059334 A | 4/2014 |
| JP | 2016-097529 A | 5/2016 |
| JP | 2018-013787 A | 1/2018 |
| KR | 10-2004-0092478 A | 11/2004 |
| KR | 10-2007-0036791 A | 4/2007 |
| KR | 10-2007-0067245 A | 6/2007 |
| KR | 10-2008-0004907 A | 1/2008 |
| KR | 10-2008-0033859 A | 4/2008 |
| KR | 10-2009-0097807 A | 9/2009 |
| KR | 10-2011-0001983 A | 1/2011 |
| KR | 10-2011-0071630 A | 6/2011 |
| KR | 10-2015-0144724 A | 12/2015 |
| KR | 10-2017-0031640 A | 3/2017 |
| KR | 10-2017-0091163 A | 8/2017 |
| WO | 2007-032170 A1 | 3/2007 |
| WO | 2016-104112 A1 | 6/2016 |
| WO | 2016-203915 A1 | 12/2016 |
| WO | 2018-012433 A1 | 1/2018 |

\* cited by examiner

VISIBILITY IMPROVING FILM FOR DISPLAY PANEL AND DISPLAY DEVICE COMPRISING SAME

CROSS-REFERENCE TO RELATED APPLICATION(S)

This application is a 35 U.S.C. 371 National Phase Entry Application from PCT/KR2019/002809, filed on Mar. 11, 2019, designating the United States, which claims the benefits of filing dates of Korean Patent Application No. 10-2018-0028073 filed with Korean Intellectual Property Office on Mar. 9, 2018, and Korean Patent Application No. 10-2019-0027071 filed with Korean Intellectual Property Office on Mar. 8, 2019, the entire contents of which are incorporated herein by reference.

TECHNICAL FIELD

The present disclosure relates to a visibility improving film for a display panel and a display device including the same.

More specifically, the present disclosure relates to a visibility improving film for a display panel capable of exhibiting excellent optical properties such as luminance and contrast ratio particularly while improving the visibility of a laser pointer, by including fine metal particles having a specific size and shape, and to a display device including the visibility improving film for the display panel.

BACKGROUND ART

For a presentation in, for example, lectures, conferences, or announcements, it is common for material images to be reproduced using a display device and for the presenter to give a presentation while pointing to a screen or the like using a laser pointer at a certain position on a presentation image.

Conventionally, the presentation is often performed by projecting material images on a screen or wall using a beam projector. However, in the case of the projector system, there are disadvantages in that the contrast ratio and image quality are not good. Recently, a high number of large-sized display panels with various driving methods such as LCDs, PDPs, and OLEDs have been supplied, and thereby it is becoming possible to make presentations by displaying images directly on the displays.

However, the display device has light emission characteristics, and there is no factor that can scatter the laser light in addition to regular reflection at a specific angle. This causes a problem in that the visibility of the laser pointer is remarkably deteriorated.

Therefore, there is still a need to develop a method for improving the visibility of a laser pointer in a display device without requiring excessive additional steps.

BRIEF DESCRIPTION OF THE INVENTION

The present disclosure provides a visibility improving film for a display panel capable of exhibiting excellent physical and optical properties while improving the visibility of a laser pointer at a low cost in a display panel such as an LCD, a PDP, and an OLED, and a display device including the same.

One aspect of the present disclosure provides a visibility improving film for a display panel, including:
a polyethylene terephthalate substrate; and
a photocurable resin layer that is provided on at least one side of the substrate and in which fine metal particles are dispersed,
wherein a relative visibility evaluation value represented by the following Formula 1 is 3 or more:

Visibility Evaluation Value=$B1/A1$ [Formula 1]

wherein, in the above Formula 1,
A1 is a luminance value measured from the front side, when a film having a transmittance of 93.0% according to JIS K 7361 and a haze value of 0.3 according to JIS K 7136 is bonded to a glass slide, then placed on a backlight surface and irradiated with laser light at 60° with respect to the normal direction, and
B1 is a luminance value measured from the front side, when the visibility improving film for a display panel is bonded to a glass slide, then placed on a backlight surface and irradiated with the same laser light at 60° with respect to the normal direction.

Another aspect of the present disclosure provides a display device including the above-mentioned visibility improving film for a display panel.

Advantageous Effects

The visibility improving film for a display panel according to the present disclosure can remarkably improve the visibility of a laser pointer, which is deteriorated on a display device.

In addition, such an effect can be obtained by applying it in the form of a film to the outside of the display panel without changing the display driving method, the color filter inside the panel, the laminated structure, or the like, and therefore production costs can be reduced since excessive process modification or cost increases are not required.

DETAILED DESCRIPTION OF THE INVENTION

The visibility improving film for a display panel according to the present disclosure includes:
a polyethylene terephthalate substrate; and
a photocurable resin layer that is provided on at least one side of the substrate and in which fine metal particles are dispersed,
wherein a relative visibility evaluation value represented by the following Formula 1 is 3 or more:

Visibility Evaluation Value=$B1/A1$ [Formula 1]

wherein, in the above Formula 1,
A1 is a luminance value measured from the front side, when a film having a transmittance of 93.0% according to JIS K 7361 and a haze value of 0.3 according to JIS K 7136 is bonded to a glass slide, then placed on a backlight surface and irradiated with laser light at 60° with respect to the normal direction, and
B1 is a luminance value measured from the front side, when the visibility improving film for a display panel is bonded to a glass slide, then placed on a backlight surface and irradiated with the same laser light at 60° with respect to the normal direction.

In addition, the display device of the present disclosure includes the display panel and the visibility improving film for the display panel mounted on the display panel.

In the present disclosure, the term "upper surface" means a surface arranged to face a viewer when the film is mounted on a display panel, and the term "upper" means the direction directed toward the viewer. Conversely, the term "lower surface" or "lower" means a surface or a direction arranged to face a side opposite to a viewer when the film is mounted on a display panel.

In the present disclosure, simply, the haze value or the total haze value means a haze value (Ht) measured with respect to the film itself without any further treatment on the film. The total haze value (Ht) represents the sum of the haze value due to the surface unevenness of the film and the haze value due to the particles or the like contained in the film.

In the present disclosure, the transparent film is a film including a transparent substrate and a transparent photocurable layer, and means a transparent film having a total haze value (Ht) described above of about 1% or less, or about 0 to 1% or less, and preferably about 0 to about 0.5% or less. Specifically, the transparent photocurable layer contained in the transparent film does not contain fine particles therein, and has high transparency and a very low haze value (Ht) as described above, and thus it may be used to measure a relative luminance for the evaluation of the visibility. Specifically, for example, it may be a concept including a film corresponding to Comparative Example 1 of the present disclosure.

Further, the terms used herein are used only to explain illustrative examples, and are not intended to limit the invention. A singular expression includes a plural expression unless clearly meaning otherwise. It should be understood that the terms "comprise", "include", and "have" as used herein are intended to designate the presence of stated features, numbers, steps, constitutional elements, or combinations thereof, but it should be understood that they do not preclude the possibility of existence or adding of one or more other features, numbers, steps, constitutional elements, or combinations thereof.

Further, in the present disclosure, in case a layer or an element is mentioned to be formed "on" or "above" another layer or element, it means that the layer or element is directly formed on the other layer or element, or it means that another layer or element may be additionally formed between layers or on a subject or substrate.

Since a variety of modification may be made to the present disclosure and there may be various forms of the present disclosure, specific examples are illustrated and will be described in detail below. However, it should be understood that this is not intended to limit the present disclosure to particular forms disclosed herein, and the invention compasses all modifications, equivalents, or alternatives falling within the spirit and technical scope of the present disclosure.

Hereinafter, the visibility improving film for a display panel and the display device including the same according to embodiments of the present disclosure will be described in more detail.

According to embodiments of the present disclosure, a visibility improving film for a display panel is provided, including:

a polyethylene terephthalate substrate; and a photocurable resin layer that is provided on at least one side of the substrate and in which fine metal particles are dispersed, wherein a relative visibility evaluation value represented by the following Formula 1 is 3 or more:

Visibility Evaluation Value=$B1/A1$   [Formula 1]

wherein, in the above Formula 1,

A1 is a luminance value measured from the front side, when a film having a transmittance of 93.0% according to JIS K 7361 and a haze value of 0.3 according to JIS K 7136 is bonded to a glass slide, then placed on a backlight surface and irradiated with laser light at 60° with respect to the normal direction, and B1 is a luminance value measured from the front side, when the visibility improving film for a display panel is bonded to a glass slide, then placed on a backlight surface and irradiated with the same laser light at 60° with respect to the normal direction.

The visibility improving film for a display panel formed by using the coating composition according to the present disclosure can exhibit characteristic refraction properties with respect to light in a wavelength range used for a laser pointer, and thus can contribute to improvement of the visibility of the laser pointer.

Such a visibility improving film for a display panel includes a cured product of a binder containing a photocurable functional group and fine metal particles dispersed in the photocurable binder.

Commonly used films for display panels include at least one substrate selected from the group consisting of glass, a polyester such as polyethylene terephthalate (PET), a polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetherether ketone (PEEK), polyethylene naphthalate (PEN), polyetherimide (PEI), polyimide (PI), MMA (methyl methacrylate), a fluorocarbon resin, triacetylcellulose (TAC), and the like.

Among these substrates, triacetylcellulose (TAC) films are particularly excellent in optical properties and thus are frequently used. However, the triacetylcellulose film not only is expensive and thus very economically disadvantageous, but also does not have sufficient durability according to environmental conditions such as moisture resistance and heat resistance and thus can lower the function of the polarizing plate under a high-temperature and high-humidity environment.

In particular, as the display device using a laser pointer as in the present application is mainly applied to a large display panel, and triacetyl cellulose substrate has a high moisture permeability and thus is disadvantageous in terms of durability, thereby occurring a light leakage phenomenon.

Thus, the visibility improving film for a display panel according to one aspect of the present disclosure includes a polyethylene terephthalate (PET) substrate. The polyethylene terephthalate substrate is very cheap compared to triacetyl cellulose, is excellent in mechanical properties such as low moisture permeability, high heat resistance and high strength, and further is excellent in optical properties such as transparency. Therefore, attempts have been made to replace the triacetyl cellulose film.

However, since polyethylene terephthalate has intrinsic birefringence characteristics due to the aromatic ring contained in the repeating unit, a rainbow unevenness phenomenon, or stripes due to interference may occur when applied to a hard coating film for display such as a polarizer film.

The visibility improving film for a display panel according to one embodiment of the present disclosure can include a polyethylene terephthalate substrate having in-plane birefringence, and a retardation value of about 5000 nm or more, preferably about 7000 nm or more. In addition, the substrate in which the upper limit of the retardation value is about 25000 nm or less, or about 20000 nm may be used. If the retardation value is small, a rainbow non-uniformity phenomenon, or interference fringes may occur, and if the retardation value is too large, it may be difficult to reduce the thickness, and problems such as a decrease in moisture permeability and heat resistance may occur.

As used herein, the term "retardation" means retardation in the plane of the polyethylene terephthalate film.

The retardation of such a substrate film can be calculated, for example, by measuring the refractive index and thickness in the biaxial direction, and generally, measurement can be performed by an automatic birefringence measuring apparatus or the like using light of about 589 nm wavelength, which is sodium-D radiation.

Moreover, according to one embodiment of the present disclosure, the polyethylene terephthalate substrate has a heat shrinkage of about 2% or less when heat treated at about 80° C. for about 30 minutes, and may have very excellent durability against a temperature change, and thus, when applied to the display device, the light leakage phenomenon can be effectively prevented.

As described above, the polyethylene terephthalate substrate is excellent in moisture resistance, heat resistance, mechanical properties and optical properties, and additionally, there is an advantage in terms of coating properties because wrinkles do not form on the substrate when forming a coating layer with the coating composition.

Specifically, in the case of products applied to large displays as in the present disclosure, it is necessary to coat a wide substrate of about 1000 mm or more, but the tension running on the substrate during roll coating is not uniform, which may lead to coating non-uniformity in the machine direction (MD). In particular, when having a relatively high haze value for the purpose of improving visibility of a laser pointer, the possibility of generation of non-uniformity in the line coating is higher, and the coating flow in the vertical direction is more visually recognized which may cause a problem of deterioration of the appearance of the coating surface.

However, according to one aspect of the present disclosure, by using a PET substrate of specific properties, the substrate film can be uniformly fixed at high modulus during coating, thereby improving the coating uniformity. As a result, the coating flow is not visually recognized, which is more advantageous in appearance.

Further, the polyethylene terephthalate substrate may have a thickness of about 10 to about 150 μm, or about 40 to about 100 μm.

According to one embodiment of the invention, the photocurable resin layer may be formed on one side or both sides of the substrate. In particular, when the resin layer is formed so as to be on the side of the upper portion of the substrate, that is, in the direction of the viewer, the resin layer can also serve as a hard coating layer.

According to one embodiment of the invention, a photocurable resin layer is formed by coating and ultraviolet-curing on a substrate, and a coating composition containing a photocurable binder or the like can be used.

The coating composition for producing the visibility improving film for a display panel of the present disclosure may include: a binder containing a photocurable functional group; fine metal particles dispersed in the binder; a photopolymerization initiator; solvents; etc.

The binder containing the photo-curable functional group is not particularly limited as long as it is a compound containing an unsaturated functional group capable of causing a polymerization reaction by ultraviolet rays, but it may be a compound containing a (meth)acrylate group, an allyl group, an acryloyl group, or a vinyl group as the photocurable functional group. According to one embodiment of the invention, the binder containing the photo-curable functional group may be at least one selected from the group consisting of a multifunctional acrylate-based monomer, a multifunctional acrylate-based oligomer, and a multifunctional acrylate-based elastic polymer.

In the present disclosure, the acrylate-based means not only acrylates, but also methacrylates, or derivatives of acrylates or methacrylates having substituents introduced therein.

The multifunctional acrylate-based monomer means a monomer containing two or more acrylate-based functional groups. More specific examples thereof may include hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tri(tetra)acrylate (PETA), dipentaerythritol hexaacrylate (DPHA), or the like, but the coating composition of the present disclosure is not limited thereto. The multifunctional acrylate-based monomer performs a role of providing certain pencil strength and abrasion resistance to the film by being cross-linked.

The multifunctional acrylate-based monomer may be used either alone or as a combination of different types.

The multifunctional acrylate-based oligomer is an oligomer having two or more acrylate functional groups, and may have a weight average molecular weight in a range of about 1000 to about 10,000 g/mol, about 1000 to about 5000 g/mol, or about 1000 to about 3000 g/mol.

Further, according to one embodiment of the present disclosure, the multifunctional acrylate-based oligomer may be an acrylate-based oligomer modified with one or more types of urethane, ethylene oxide, propylene oxide, or caprolactone. When using the modified multifunctional acrylate-based oligomer, flexibility is further imparted to the multifunctional acrylate-based oligomer due to modification and thus a curl property and flexibility of a protective film can be increased.

The multifunctional acrylate-based oligomer may be used either alone or as a combination of different types.

The multifunctional acrylate-based elastic polymer is excellent in flexibility and elasticity, and is a polymer containing two or more acrylate functional groups, which may have a weight average molecular weight ranging from about 100,000 to about 800,000 g/mol, from about 150,000 to about 700,000 g/mol, or from about 180,000 to about 650,000 g/mol.

A protective film formed by using a coating composition including the multifunctional acrylate-based elastic polymer may secure high elasticity or flexibility while securing mechanical properties, and may minimize curl or crack occurrences.

Another example of the multifunctional acrylate-based elastic polymer may include a urethane-based acrylate polymer. The urethane-based acrylate polymer has a form of a urethane-based acrylate oligomer being linked to an acrylic polymer main chain as a side branch.

Meanwhile, according to one embodiment of the present disclosure, the coating composition can exhibit light scattering properties of a laser pointer by including fine metal particles. When the coating composition includes fine metal particles, the photocurable resin layer cured by using this can effectively scatter a laser light used for the laser pointer, thereby improving the visibility.

Generally, when producing a film or the like for a display panel, inorganic fine particles such as metal oxides, or organic particles are often used in the coating composition or the like. This is because the corresponding particles have high transmittance.

Such transmissive particles and the like cause light scattering mainly by refraction and diffraction, while the metal particles reflect light. More specifically, in the case of the transmissive particles, light scattering due to diffraction and refraction occurs consecutively along the path along which the light travels. Consequently, the light spreads and cloudy light appears. However, in the case of metal particles, since light scattering occurs due to reflection without transmitting light, light scattering does not occur consecutively along the path along which the light travels, and the light spreading phenomenon does not occur.

In particular, when metal oxide-based inorganic particles such as titanium dioxide ($TiO_2$) particles having a different refractive index from that of the binder are used, a high light scattering effect can be obtained, but there is a disadvantage that the contrast ratio is greatly lowered due to high transmittance of the particles.

The contrast ratio of the display device is caused by the difference between the brightness of the image coming from the display panel and the brightness difference due to the film. In the case of using the transmissive particles, the brightness in the film is increased by the particles, and eventually, the difference in brightness between the panel and film becomes low and thus the contrast ratio is lowered.

Therefore, the film for a display panel according to the embodiment of the present disclosure can improve the visibility of laser pointer light by using the fine metal particles, and at the same time, realize a high contrast ratio.

The average particle size of the fine metal particles may be about 0.5 μm or more from the viewpoint of optimizing the light scattering effect, and in order to make the haze and coating thickness appropriate, it can be a particle with a size of 5 μm or less, more preferably about 0.5 to about 3 μm, or about 1 to about 3 μm.

When the particle size of the fine metal particles is too small, the effect of improving the visibility of a laser pointer light due to scattering of light may be insignificant, and when the particle size of the fine metal particles is too large, a protrusion is formed on the surface of the film, which may cause a decrease in optical properties such as transparency and transmittance.

The average particle size of the metal fine particles can be obtained by checking the particle size of the entire fine metal particles contained in the resin layer. The particle size of the fine metal particle can be confirmed by the cross section of the resin layer, etc. Moreover, the average particle size of the fine particles can be confirmed through the particle sizes of the entire metal fine particles or their average particle sizes used in the production of the resin layer.

The fine metal particles may be a group of individual fine particles having an average particle size of about 0.5 to about 5 μm, and individual fine particles included in this group may have a particle size of about 0.1 to about 25 μm. More specifically, 95%, or 99% of the individual fine particles included in the group may have a particle size of about 0.1 to about 25 μm.

More specific examples of metals satisfying these conditions include at least one metal selected from the group consisting of aluminum, gold, silver, magnesium, platinum, copper, titanium, zirconium, nickel, tin, silicon, and chromium, or an alloy thereof, but the present disclosure is not necessarily limited thereto.

According to one embodiment of the present disclosure, when the total weight of the binder containing a photocurable functional group is taken as 100 parts by weight, the fine metal particles may be contained in an amount of about 0.5 to about 15 parts by weight, preferably about 1 to about 15 parts by weight, or about 1 to about 10 parts by weight.

When the fine metal particles are contained in an excessively small amount, the light reflection effect at the corresponding wavelength is insignificant and thus the effect of improving the visibility of the laser pointer may not be sufficient. When the fine metal particles are contained in an excessively large amount, color reproducibility and luminance of the display device may be lowered, and other physical properties of the coating composition may be deteriorated. In this respect, it is preferable to be included in the above range.

Examples of the photo-polymerization initiator contained in the coating composition of the present disclosure may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methyl benzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, and bis (2,4,6-trimethylbenzoyl)-phenylphosphine oxide, and the like. In addition, examples of products now commercially available may include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, or the like. These photo-polymerization initiators may be used alone or in combination of two or more kinds.

According to one embodiment of the present disclosure, the content of the photo-polymerization initiator is not particularly limited, but it may be used in an amount of about 0.1 to about 10 parts by weight, based on 100 parts by weight of the total weight of the binder containing the photocurable functional group, without deteriorating physical properties of the total coating composition.

The organic solvent contained in the coating composition of the present disclosure may be an alcohol solvent such as methanol, ethanol, isopropyl alcohol, and butanol; an alkoxy alcohol solvent such as 2-methoxyethanol, 2-ethoxyethanol, and 1-methoxy-2-propanol; a ketone solvent such as acetone, methylethylketone, methylisobutyl ketone, methylpropyl ketone, and cyclohexanone; an ether solvent such as propylene glycol monopropylether, propylene glycol monomethyl ether, ethylene glycol monethylether, ethylene glycol monopropylether, ethylene glycol monobutylether, diethylene glycol monomethylether, diethylglycolmonoethylether, diethylglycolmonopropylether, diethylglycolmonobutylether, diethylene glycol-2-ethylhexyl ether; an aromatic solvent such as benzene, toluene, and xylene; and they may be used alone or in combination thereof.

According to one embodiment of the present disclosure, the content of the organic solvent may be variously adjusted within a range that does not deteriorate the physical properties of the coating composition, but the organic solvent may be used in an amount of about 50 to about 200 parts by weight, preferably about 100 to about 200 parts by weight, based on 100 parts by weight of the binder containing the photocurable functional group. When the amount of organic solvent is within the above ranges, it may exert appropriate fluidity and coatability.

Meanwhile, according to one embodiment of the present disclosure, the coating composition or the photocurable resin layer may further include inorganic oxide fine particles having an average particle size of 1 to 10 μm. Such inorganic oxide fine particles may be dispersed in the above-described coating composition, and can exhibit light scattering properties at the time of forming the coating layer.

When the coating composition includes inorganic oxide fine particles, the photocurable resin layer cured by using them has the characteristic of scattering light and can add the effect of enhancing the visibility by scattering the laser light used in the laser pointer.

The average particle size of the inorganic oxide fine particles may be about 1 μm or more from the viewpoint of optimizing the light scattering effect, and 10 μm or less, more preferably about 1 to about 5 μm, still more preferably about 1 to about 3 μm from the viewpoint of making haze and coating thickness appropriate.

When the particle size of the inorganic oxide fine particles is too small, the effect of preventing the regular reflection of the laser pointer light caused by the scattering of light may be insignificant, and when the particle size is too large, there may be a problem that the haze is increased.

The average particle size of the inorganic oxide fine particles can be determined by confirming the particle sizes of the entire inorganic oxide fine particles contained in the resin layer. The particle size of the inorganic oxide fine particles can be confirmed by the cross section of the resin layer or the like. Further, the average particle size of the inorganic oxide fine particles can be confirmed through the particle sizes of the entire inorganic oxide fine particles or their average particle sizes used in the production of the resin layer.

The inorganic oxide fine particles may be a group of individual fine particles having an average particle size of about 1 to about 10 μm, and the individual fine particles contained in this group may have a particle size of about 0.1 to about 30 μm. More specifically, 95% or 99% of the individual fine particles contained in the group may have a particle size of about 0.1 to about 30 μm.

The inorganic oxide fine particles can be used without limitation in the constitution as long as they are a type used for forming the anti-glare film.

For example, the inorganic oxide fine particles may be an oxide of one or more inorganic elements selected from the group consisting of silicon, aluminum, titanium, zirconium, cerium, hafnium, niobium, tantalum, indium, tin, zinc, barium, and magnesium, but the present disclosure is not limited thereto.

The total content of the inorganic oxide fine particles may be in the rage of about 1 to about 30 parts by weight, preferably about 5 to about 30 parts by weight, more preferably about 5 to about 20 parts by weight, based on 100 parts by weight of the binder containing the photocurable functional group.

When the total content of the inorganic oxide fine particles is too small, the surface haze value due to external irregularities is not sufficiently realized. When the content is too high, the viscosity of the coating composition is increased, the coating property becomes poor and the haze value due to external scattering becomes too large, and thus the contrast ratio may be lowered.

According to one embodiment of the present invention, the refractive index difference between the inorganic oxide fine particles and the cured resin of the binder containing a photocurable functional group may be about 0.1 or less, preferably about 0.07 or less, and more preferably about 0.05 or less. When the refractive index difference is too large, the internal scattering increases and the haze value increases, but the contrast ratio may decrease.

Meanwhile, it may be preferable that the weight ratio of the fine metal particles and the inorganic oxide fine particles contained in the photocurable resin layer is about 1:100 to about 1:2 or about 1:25 to about 1:2.

When the inorganic fine particles are contained in an excessively large amount exceeding the above range, the contrast ratio and the viewing angle may be lowered. When the fine metal particles are contained in an excessively large amount, there may be a problem that the luminance and the contrast ratio may be lowered.

Meanwhile, the coating composition of the present disclosure may further include an additive commonly used in the art to which the present disclosure pertains, such as a surfactant, an antioxidant, a UV stabilizer, a leveling agent, or an antifouling agent, in addition to the above-described components. Here, the content thereof may be variously adjusted within a range that does not deteriorate the physical properties of the coating composition of the present disclosure. Thus, there is no particular limitation thereto, but for example, it may be included in an amount of about 0.1 to about 10 parts by weight based on 100 parts by weight of the total coating composition.

According to one embodiment of the present disclosure, the photocurable resin layer formed by using the coating composition may have a thickness of at least about 1 μm, for example, about 1 to about 50 μm, about 5 to about 30 μm, or about 5 to about 20 μm, after drying and curing. Appropriate optical and physical properties can be exhibited within the thickness range as above.

Accordingly, the ratio of the average particle size of the fine metal particles to the thickness of the photocurable resin layer may preferably be about 0.5 or less.

The visibility improving film for a display panel of the present disclosure as described above can be formed by coating a coating composition onto a transparent plastic substrate and photo-curing the coating composition.

Specific descriptions and examples of the coating composition and each component constituting the composition are the same as described above.

The method of coating the coating composition is not particularly limited as long as it may be used in the art to which the present technology belongs. For example, a bar coating method, a knife coating method, a roll coating method, a blade coating method, a die coating method, a microgravure coating method, a comma coating method, a slot die coating method, a lip coating method, a solution casting method, or the like may be used.

Next, a protective film may be formed by carrying out a photocuring reaction through irradiating ultraviolet rays on the coated composition. The coated surface of the composition is flattened before irradiating the ultraviolet rays, and a drying step for volatizing a solvent included in the composition may be further carried out.

The amount of the ultraviolet irradiation may be, for example, from about 20 to about 600 $mJ/cm^2$. The light source of the ultraviolet irradiation is not particularly limited as long as it is capable of being used in the art, and examples thereof may include a high-pressure mercury lamp, a metal halide lamp, a black light fluorescent lamp, and the like.

The visibility improving film for a display panel of the present disclosure includes fine metal particles having a specific shape as described above, and can effectively reflect a laser light made incident on the liquid crystal display by means of a laser pointer. Therefore, it is possible to provide a display device capable of realizing excellent image quality with high luminance and contrast ratio, while improving the visibility of a laser pointer.

Specifically, the visibility improving film for a display panel according to the present disclosure has a relative visibility evaluation value represented by the following Formula 1 of 3 or more:

$$\text{Visibility Evaluation Value} = B1/A1 \quad \text{[Formula 1]}$$

wherein, in the above Formula 1,

A1 is a luminance value measured from the front side, when a film having a transmittance of 93.0% according to JIS K 7361 and a haze value of 0.3 according to JIS K 7136 is bonded to a glass slide, then placed on a backlight surface and irradiated with a laser light at 60° with respect to the normal direction, and B1 is a luminance value measured from the front side, when the visibility improving film for a display panel is bonded to a glass slide, then placed on a backlight surface and irradiated with the same laser light at 60° with respect to the normal direction.

As described above, the visibility improving film for a display panel of the present disclosure can realize an effect of increasing the luminance by about 50% or more, preferably about 60% or more, relative to the luminance before irradiation, due to the scattering/reflection light by the fine metal particles, as compared with the case of using a general UV curable coating layer, and thereby the visibility of the laser pointer can be remarkably improved.

According to one embodiment of the present disclosure, the visibility improving film for a display panel may have excellent optical properties, for example, may have a value of luminance ratio represented by the following Formula 2 of about 70% or more, preferably about 75% or more, or about 80% or more.

$$\text{Luminance Ratio} = (B2/A2)*100 \quad \text{[Formula 2]}$$

wherein, in the above Formula 2,

A2 is a darkroom contrast ratio value measured from the front side, when a film having a transmittance of 93.0% according to JIS K 7361 and a haze value of 0.3 according to JIS K 7136 is bonded to a glass slide and then placed on a backlight surface, and B2 is a darkroom contrast ratio value measured from the front side, when the visibility improving film for a display panel is bonded to a glass slide and then placed on a backlight surface.

The visibility improving film for a display panel may have a haze value of about 25% or less, preferably about 20% or less, or about 5 to about 20%, as measured according to JIS K 7136, and the ratio of a surface haze value: an internal haze value may be about 0.5 to about 1.0.

In the present disclosure, simply, the haze value or the total haze value means a haze value (Ht) measured with respect to the film itself without any further treatment on the film. The total haze value (Ht) represents the sum of the haze value due to the surface unevenness of the film and the haze value due to the particles or the like contained in the film.

In the present disclosure, the internal haze value (Hi) means a haze value resulting from particles contained in the film or the like, as described above. Specifically, such an internal haze value means a haze value measured after removing a surface irregularity by attaching a transparent adhesive film to the film surface, in order to remove a factor caused by surface irregularities, that is, a surface haze, in a film having irregularities formed on its surface.

Further, the visibility improving film for a display panel may have a light transmittance value of about 80% or more, or about 83% or more, as measured according to JIS K 7361.

In an optical film or the like, the transmittance and the haze properties are changed depending on the introduced particles contained in the film. Generally, the greater the amount of the light scattering particles having similar optical properties, the greater the tendency of the transmittance is of being lowered and the haze being increased.

However, depending on the type of particles used, it is possible to have a characteristic relationship between transmittance and haze. In particular, when the fine metal particles are contained in the resin layer, they have the reflection characteristics as described above, and thus can show a lower haze value than that of the organic fine particles or the inorganic oxide fine particles commonly used in the art, while decreasing light transmittance. In particular, when compared with the case of using the transmissive light scattering particles, even if they show the same transmittance value, there is a feature that they can have a relatively low internal haze value.

In particular, the light transmittance value varies depending on the content of particles. When the transmittance value is too high, there is a problem that the amount of particles for scattering or reflecting light is absolutely deficient, thereby failing to realize appropriate visibility. When the transmittance value is too low, the visibility is good, but the contrast ratio and luminance are lowered, which may cause a problem that the image quality of the image to be mounted on the display deteriorates.

Therefore, by limiting the range of the above-described light transmittance (Tt), the characteristic haze value attributable to the use of the specific fine metal particles and inorganic oxide fine particles, and the ratio of a surface haze value: an internal haze value, it can exhibit excellent visibility in the use of the laser pointer and at the same time realize an excellent contrast ratio.

The visibility improving film for a display panel according to the present disclosure may have a pencil hardness of HB or more, 1H or more, or 2H or more at a load of 500 g.

In addition, when steel wool #0 is attached to a friction tester and then reciprocated 10 times with a load of 200 g, a load of 300 g, or a load of 400 g, it can exhibit wear resistance such that scratches do not occur.

According to one embodiment of the present disclosure, the visibility improvement film for a display panel may be in a form further including: a substrate; a resin layer provided on the substrate; and at least one functional coating layer of the antireflection layer and the antiglare layer, which are formed on the resin layer.

Since the antireflection layer prevents regular reflection when using a laser pointer in addition to the antireflection effect in the existing display panel film, the laser pointer light is regularly reflected, thereby effectively preventing it from directly entering the eye of the viewer looking at the image. As such antireflection layer, a general antireflection layer which is used in a film for an existing display device or an optical film for a polarizing plate, specifically, for example, an antireflection layer or an antireflection coating (AR) that utilizes interference of light by forming a plurality of layers having different refractive indexes, may be used without particular limitation.

Further, the anti-glare layer allows the laser pointer light to diffusely reflect due to the surface unevenness when using a laser pointer, and thereby it can effectively prevent the reflection light from directly entering the eye of the viewer looking at the image. In such anti-glare layer, a method of dispersing a filler such as inorganic fine particles in a resin and imparting unevenness to the surface (anti-glare, AG) and the like can be used without particular limitation.

When the antireflection layer and the antireflection layer are provided, such a functional coating layer may be preferably located at the top of the film.

Meanwhile, according to another embodiment of the present disclosure, a display device including a display panel and the above-mentioned visibility improving film for the display panel is provided.

In this case, the display panel is not particularly limited to a driving method or structure, and it can be applied to all of LCD panels, PDP panels, and OLED panels.

The visibility improving film for a display panel and the display panel may be adhered through lamination using a separate adhesive and the like. The adhesive capable of being used herein is not particularly limited as long as it is known in the art. Examples thereof may include water-based adhesives, one component or two component polyvinyl alcohol (PVA)-based adhesives, polyurethane-based adhesives, epoxy-based adhesives, styrene butadiene rubber (SBR)-based adhesives, hot melt-type adhesives, or the like, but the present disclosure is not limited to these examples.

Further, the fact that the resin layer may also serve as an adhesive layer is as described above. When the resin layer does not serve as the adhesive layer, the substrate surface on which the resin layer is not formed adheres to the display panel side, and the resin layer is laminated so as to be located toward the outside, and thereby it may be preferable to form a structure for directly facing the surface to which the laser pointer is made incident.

Hereinafter, actions and effects of the present disclosure will be described in more detail through specific examples, but these examples are given to merely illustrate the invention and are not intended to limit the scope of the invention thereto.

EXAMPLE

Preparation of Coating Composition and Visibility Improving Film for Display Panels Example 1

Based on 100 parts by weight in total, 16 parts by weight of pentaerythritol tri(tetra)acrylate (PETA);

16 parts by weight of six-functional urethane acrylate (trade name: EB-1290);

8 parts by weight of aluminum particle dispersion (toluene dispersion of spherical particles having a solid content of 20 wt %, aluminum purity of 99.8%, and an average particle size of about 2 μm);

0.2 part by weight of Megaface F-477 (manufactured by DIC Corporation) as a leveling agent;

2.0 parts by weight of Irgacure 184 as a photopolymerization initiator;

22 parts by weight of a silica dispersion (manufacture by Tosoh Silica, toluene dispersion having a solid content of 20%, using SS50 having an average particle size of 1 to 2 μm);

the balance mixed solvent containing methyl ethyl ketone and 2-butanol in a weight ratio of 1:1, were mixed to prepare a coating composition for visibility improving film for a display panel.

The composition was coated onto a PET film having a retardation value of 8000 nm and a thickness of 80 μm (when heat treated at 80° C. for 30 minutes, shrinkage in MD direction: 0.14%, and shrinkage in TD direction: 0.01%) using a #8 bar.

The resulting coating was dried at 60° C. for 2 minutes and then irradiated at a dose of 200 mj/cm$^2$ using UV mercury lamp to form a photocurable resin layer having an average dry thickness of 5 μm, thereby manufacturing a visibility improving film for a display panel.

Example 2

Based on 100 parts by weight in total, 32 parts by weight of pentaerythritol tri(tetra)acrylate (PETA);

8 parts by weight of aluminum particle dispersion (solid content: 20 wt %, particle average particle size: 5 μm);

0.2 part by weight of a leveling agent;

2.5 parts by weight of a photopolymerization initiator;

22.3 parts by weight of silica dispersion; and the balance mixed solvent containing methyl ethyl ketone and 2-butanol in a weight ratio of 1:1, were mixed to prepare a coating composition for visibility improving film for a display panel.

The composition was coated onto a PET film having a retardation value of 8000 nm and a thickness of 80 μm (when heat treated at 80° C. for 30 minutes, shrinkage in MD direction: 0.14%, and shrinkage in TD direction: 0.01%) using a #8 bar.

The resulting coating was dried at 60° C. for 2 minutes and then irradiated at a dose of 200 mj/cm$^2$ using UV mercury lamp to form a photocurable resin layer having an average dry thickness of 5 μm, thereby manufacturing a visibility improving film for a display panel.

Comparative Example 1

A coating composition was prepared using the same composition as in Example 1, except that silica dispersion and aluminum particle dispersion were not used, thereby manufacturing a visibility improving film for a display panel.

Comparative Example 2

Based on 100 parts by weight in total, 17.5 parts by weight of pentaerythritol tri(tetra)acrylate (PETA);

17.3 parts by weight of six-functional urethane acrylate;

5 parts by weight of organic particles having a refractive index of 1.555 (average particle size of the particles: 4 μm)

0.2 part by weight of a leveling agent;

2.0 parts by weight of a photopolymerization initiator; and 20 parts by weight of methyl ethyl ketone and 38 parts by weight of 2-butanol as a solvent, were mixed to prepare a coating composition.

The composition was coated onto a PET film having a retardation value of 8000 nm and a thickness of 80 μm using a #8 bar.

The resulting coating was dried at 60° C. for 2 minutes and then irradiated at a dose of 200 mj/cm$^2$ using UV mercury lamp to form a photocurable resin layer having an average dry thickness of 5 μm, thereby manufacturing a visibility improving film for a display panel.

Comparative Example 3

A visibility improving film for a display panel was manufactured in the same manner as in Example 1, except that an acrylic film having a thickness of 60 μm was used as a substrate.

Experimental Example

Measurement of Light Transmittance Tt Value

The transmittance values (Tt) of the visibility improving films for display panels manufactured in Examples and Comparative Examples above were measured according to JIS K 7361 using a haze meter HM-150 (Murakami).

Measurement of Haze Value

The haze values of the visibility improving films for display panels manufactured in Examples and Comparative Examples above were measured according to JIS K 7136 using a haze meter HM-150 (Murakami).

The internal haze (Hi) value was measured in order to eliminate the value due to surface irregularities, after laminating an adhesive film (LG Chem, S7) on the upper surface of the visibility improving film for display panel manufactured in Examples and Comparative Examples above, and then peeling off the protective film and removing the irregularities on the film surface.

The surface haze (Hs) value was calculated by subtracting the internal haze value from the total haze value (Ht-Hi).

Regular Reflection Prevention

The degree of spreading of image due to the regular reflection of the laser pointer (3M, LP-7000) light made incident at an angle of 45° on the visibility improving film for a display panel was visually discriminated. It is evaluated as very excellent if the degree of spreading is so large that the focus of the laser pointer is not visible, as excellent if the focus looks blurry, as normal if the focus is clearly visible but a spread of the peripheral area exists, and as poor if the focus was clearly visible without spread of the peripheral area.

White Turbidity

A black panel was bonded to the back surface of the visibility improving film for display panel, and then the white turbidity of the film was visually evaluated.

It was evaluated as poor if it looks cloudy even when a laser pointer visibility improving film is visually confirmed before bonding to the black panel; as normal if it appears transparent when a laser pointer visibility improving film is visually confirmed before bonding to the black panel, but it looks cloudy after bonding; as excellent if it appears transparent when a laser pointer visibility improving film is visually confirmed before bonding to a black panel, and it is excellent in black feeling even after bonding, but there is a difference upon comparing the white turbidity with the case where light scattering particles are not added; and as very excellent if there is no difference.

Laser Pointer Visibility Evaluation

The following film was bonded to a glass slide (0.7 mm) using an adhesive film and attached to a display panel, and then with respect to the light of the laser pointer (3M, LP-7000) incident at an angle of 60 degrees at a distance of 5 m over the display panel, the luminance value was measured at a distance of 7 cm from the front of the panel, thereby evaluating the visibility level of the laser pointer.

$$\text{Visibility Evaluation Value} = B1/A1 \qquad \text{[Formula 1]}$$

wherein, in the above Formula 1, $A1$ is a luminance value measured from the front side, when a film having a transmittance of 93.0% according to JIS K 7361 and a haze value of 0.3 according to JIS K 7136 is bonded to a glass slide, then placed on a backlight face and irradiated with laser light at 60° with respect to the normal direction, and $B1$ is a luminance value measured from the front side, when the visibility improving film for a display panel is bonded to a glass slide, then placed on a backlight surface and irradiated with the same laser light at 60° with respect to the normal direction.

Evaluation of Contrast Ratio Level

The following film was bonded to a glass slide (0.7 mm) using an adhesive film and attached to a display panel. In order to measure the luminance of black and white pixels, the luminance of the center portion of the panel was measured using a SR-UL2 (Topcon) equipment at a distance of 50 cm in a state of being turned on for 40 to 60 minutes for stabilizing the display panel in a dark room at 25° C., and the value thereof was calculated by the following Formula 2.

(Darkroom Contrast Ratio (CR)=Surface Luminance with all white pixels/Surface Luminance with all Black pixels)

$$\text{Luminance Ratio} = (B2/A2)*100 \qquad \text{[Formula 2]}$$

wherein, in the above Formula 2, $A2$ is a darkroom contrast ratio value measured from the front side, when a film having a transmittance of 93.0% according to JIS K 7361 and a haze value of 0.3 according to JIS K 7136 is bonded to a glass slide and then placed on a backlight surface, and $B2$ is a darkroom contrast ratio value measured from the front side, when the visibility improving film for a display panel is bonded to a glass slide and then placed on a backlight surface.

Evaluation of Rainbow Non-Uniformity

After bonding the black panel to the back surface of the visibility improving film for display panel and then wearing polarizing sunglasses under a three-wavelength lamp, it was visually observed. It was evaluated as excellent if no rainbow non-uniformity was observed; as normal if rainbow non-uniformity was partially observed; and as poor if rainbow non-uniformity was observed over the entire surface.

Evaluation of Level of Flowability

The visibility improvement film for display panel was prepared in a size of 150 mm*1000 mm, the black adhesive film was laminated, and then the coating surface was visually evaluated under a fluorescent light in a dark room.

Whether the flow line is visually recognized in the width direction was visually evaluated by 10 people, and it was evaluated as excellent when 8 or more are good, as normal when 5 or more are excellent, and as poor when 2 or less are excellent.

The measurement and evaluation results are summarized in Table 1 below.

TABLE 1

|  | Example 1 | Example 2 | Comparative Example 1 | Comparative Example 2 | Comparative Example 3 |
|---|---|---|---|---|---|
| Transmittance (%) | 84.5 | 89.2 | 93.0 | 91.2 | 84.9 |
| Haze (%) | 18.5 | 14.3 | 0.3 | 21.2 | 18.3 |
| Surface haze(%) | 6.4 | 6.8 | — | 10.7 | 6.2 |
| Internal haze (%) | 12.1 | 7.5 | — | 10.5 | 12.1 |
| Contrast ratio (%) | 83.0 | 88.2 | 100 | 92.0 | 83.0 |
| Regular reflection prevention | Excellent | Excellent | Poor | Excellent | Excellent |
| White turbidity | Very excellent | Very excellent | Very excellent | Excellent | Excellent |
| Visibility evaluative value = B1/A1 | 4.57 | 3.42 | 0.82 | 1.35 | 4.57 |
| Rainbow stain visually recognized | Excellent | Excellent | Poor | Excellent | Excellent |
| Coating flow was visually recognized | Excellent | Excellent | Excellent | Excellent | Poor |

Referring to Table 1 above, it was confirmed that in the case of Comparative Examples, despite the high haze value, the visibility of the laser pointer is very poor. In particular, it was confirmed that in the case of the viewer located at the regular reflection angle, the light reflected by the laser pointer is directly entered the eye, and an unpleasant glare can be experienced.

However, according to Examples of the present disclosure, it could be seen that while showing excellent transmittance values and excellent visibility of laser pointers, the optical properties required for conventional display panels, such as regular reflection prevention and white turbidity, are also excellent.

In addition, it could be seen that in the case of Comparative Example 1, a characteristic rainbow stain is visually recognized and in the case of Comparative Example 3, a coating flow was visually recognized, whereas in the case of Examples of the present disclosure, rainbow stains or coating flow is not visually recognized at all, and the quality is excellent in terms of coating.

The invention claimed is:

1. A visibility improving film for a display panel, comprising:
    a polyethylene terephthalate substrate; and
    a photocurable resin layer that is provided on at least one side of the substrate and in which fine metal spherical particles are dispersed,
    wherein the fine metal spherical particles consist essentially of a metal or a metal alloy,
    wherein the fine metal spherical particles have an average particle size of 1 to 5 μm,
    wherein the polyethylene terephthalate substrate has an in-plane birefringence and a retardation of 5000 nm or more, and
    wherein a relative visibility evaluation value represented by the following Formula 1 is at least 3:

Visibility Evaluation Value=$B1/A1$ [Formula 1]

wherein, in the Formula 1,
    A1 is a luminance value measured from the front side, when a film having a transmittance of 93.0% according to JIS K 7361 and a haze value of 0.3 according to JIS K 7136 is bonded to a glass slide, then placed on a backlight surface and irradiated with laser light at 60° with respect to the normal direction, and
    B1 is a luminance value measured from the front side, when the visibility improving film for a display panel is bonded to a glass slide, then placed on a backlight surface and irradiated with the same laser light at 60° with respect to the normal direction.

2. The visibility improving film for a display panel according to claim 1, wherein
    the polyethylene terephthalate substrate has each of MD and TD direction heat shrinkages of 2% or less, when heat treated at 80° C. for 30 minutes.

3. The visibility improving film for a display panel according to claim 1, wherein
    a value of luminance ratio represented by the following Formula 2 is at least 80, Luminance Ratio=$(B2/A2)*100$ [Formula 2]

wherein, in the Formula 2,
    A2 is a darkroom contrast ratio value measured from the front side, when a film having a transmittance of 93.0% according to JIS K 7361 and a haze value of 0.3 according to JIS K 7136 is bonded to a glass slide and then placed on a backlight surface, and
    B2 is a darkroom contrast ratio value measured from the front side, when the visibility improving film for a display panel is bonded to a glass slide and then placed on a backlight surface.

4. The visibility improving film for a display panel according to claim 1, wherein
    the fine metal particles include at least one metal selected from the group of aluminum, gold, silver, magnesium, platinum, copper, titanium, zirconium, nickel, tin, silicon, and chromium.

5. The visibility improving film for a display panel according to claim 1, wherein
    the fine metal particles are contained in an amount of 0.5 to 15 parts by weight, based on 100 parts by weight of the photocurable resin.

6. The visibility improving film for a display panel according to claim 1, wherein
    a ratio of the average particle size of the fine metal particles to the thickness of the photocurable resin layer is 0.5 or less.

7. The visibility improving film for a display panel according to claim 1, wherein
    the photocurable resin layer has a thickness of 1 to 50 μm.

8. The visibility improving film for a display panel according to claim 1, wherein
    the photocurable resin layer further includes inorganic oxide fine particles having an average particle size of 1 to 10 μm.

9. The visibility improving film for a display panel according to claim 1, wherein the visibility improving film has a haze value of 25% or less as measured according to JIS K 7136.

10. The visibility improving film for a display panel according to claim 1, wherein
    the visibility improving film has a light transmittance value of at least 80% as measured according to JIS K 7361.

11. The visibility improving film for a display panel according to claim 1, wherein the visibility improving film has a pencil hardness of at least HB at a load of 500 g.

12. A display device comprising a display panel and the visibility improving film for a display panel of claim 1 on the display panel.

13. A display panel comprising the visibility improving film for a display panel of claim 1 on the display panel.

14. The display device of claim 12, wherein the display panel is an LCD, a PDP, or an OLED.

\* \* \* \* \*